United States Patent [19]

Heidelberg et al.

[11] Patent Number: 5,128,575
[45] Date of Patent: Jul. 7, 1992

[54] ELECTRIC MACHINE WITH PERMANENT MAGNET ROTOR

[75] Inventors: Götz Heidelberg, Starnberg-Percha; Peter Ehrhart; Andreas Gründl, both of München, all of Fed. Rep. of Germany

[73] Assignee: Heidelberg Motor Gesellschaft für Energiekonverter mbH, Starnberg, Fed. Rep. of Germany

[21] Appl. No.: 573,043

[22] PCT Filed: Mar. 2, 1989

[86] PCT No.: PCT/EP89/00208

§ 371 Date: Sep. 4, 1990

§ 102(e) Date: Sep. 4, 1990

[87] PCT Pub. No.: WO89/08346

PCT Pub. Date: Sep. 8, 1989

[30] Foreign Application Priority Data

Mar. 2, 1988 [DE] Fed. Rep. of Germany ....... 3806760

[51] Int. Cl.⁵ ............................................. H02K 21/12
[52] U.S. Cl. ...................................... 310/156; 310/43; 310/45; 310/67 R; 310/271; 318/254
[58] Field of Search ............... 310/67 R, 156, 68 B, 310/271, 43, 45, 254, 68 R; 318/254

[56] References Cited

U.S. PATENT DOCUMENTS

| | | | |
|---|---|---|---|
| 3,581,394 | 6/1971 | Phelon | 310/156 |
| 3,836,801 | 9/1974 | Yamashita | 310/154 |
| 4,219,752 | 8/1980 | Katou | 310/156 |
| 4,227,105 | 10/1980 | Kumakura | 310/153 U X |
| 4,259,603 | 3/1981 | Uchiyama | 310/67 R |
| 4,336,649 | 6/1982 | Glaser | 310/156 |
| 4,433,261 | 2/1984 | Nashiki | 310/271 |
| 4,645,961 | 2/1987 | Malsky | 310/254 |
| 4,658,167 | 4/1987 | Popov | 310/156 |
| 4,930,201 | 6/1990 | Brown | 310/156 |

FOREIGN PATENT DOCUMENTS

| | | | |
|---|---|---|---|
| 2473803 | 7/1981 | France . | |
| 2606951 | 5/1988 | France . | |
| 59-057 | 4/1984 | Japan . | |
| 560292 | 7/1977 | U.S.S.R. . | |
| 1436209 | 11/1988 | U.S.S.R. . | |
| 2172443 | 9/1986 | United Kingdom | 310/271 |

Primary Examiner—R. Skudy
Attorney, Agent, or Firm—Spencer, Frank & Schneider

[57] ABSTRACT

An electric machine (2) comprising a first functional part (4) with a permanently magnetic excitation system (12) and a second functional part (6) with a conductor system (10), the first functional part (4) and the second functional part (6) being movable relative to each other along the active area (24) of an air gap. The first functional part (4) comprises—as seen progressively in the direction of relative movement (32)—an alternating sequence of permanent magnets (12) magnetized in the direction of relative movement (32), and of magnetically conductive material portions (14). The magnetically conductive material portions (14) each have—facing the active area (24)—a magnetic flux outlet area (22) which is smaller than the sum of the magnetic flux cross-sectional areas (21) of the two adjacent permanent magnets (12), so that the magnetic flux of the permanent magnets (12) is concentrated for the active area (24). The width of the permanent magnets (12), measured in the direction of relative movement (32), increases as their distance from the active area (24) increases, while the width of the magnetically conductive portions (14) decreases.

11 Claims, 2 Drawing Sheets

ELECTRIC MACHINE WITH PERMANENT MAGNET ROTOR

BACKGROUND OF THE INVENTION

The invention relates to an electric machine comprising a first functional part having a permanently magnetic excitation system and a second functional part having a conductor system, the first functional part and the second functional part being movable relative to each other along the active area of an air gap.

This definition describes an electric machine in its broadest form, and only the indication of a permanently magnetic excitation system reveals a more specific sector in the field of electric machines. Electric machines of this type are found most often in the form of direct current motors in which permanently magnetic north poles and south poles alternate with each other at the active area and in which the functionally required magnetic return path between adjacent magnet poles is effected either by an iron back on the back or rear side of the permanent magnets facing away from the active area, or in that the permanent magnets are partial regions of a uniform magnetic body which are magnetized in different directions. The second functional part comprises the conductor system as a rule in the form of windings or coils which are associated with individual poles. For rendering the electric motor operative, the current direction in the individual windings must be reversed by a specific distance after each relative movement of the two functional parts, which can be carried out by mechanical or electronic commutation.

SUMMARY OF THE INVENTION

It is the object of the invention to make available an electric machine of the type indicated at the outset, which on the basis of its construction can be built with higher torque and power density related to weight or volume.

To meet this object the electric machine, according to the invention, is characterized in that the first functional part comprises—as seen progressively in the direction of relative movement—an alternating sequence of permanent magnets, which are magnetized in the direction of relative movement, and of magnetically conductive material portions, that the magnetically conductive material portions each have—facing the active area—a magnetic flux outlet area which is smaller than the sum of the magnetic flux cross-sectional areas of the two adjacent permanent magnets, so that the magnetic flux of the permanent magnets is concentrated for the active area, and that the width of the permanent magnets, measured in the direction of relative movement, increases as their distance from the active area increases, while the width of the magnetically conductive portions decreases as their distance from the active area increases.

In conventional electric machines the magnetic field strength of the permanent magnets of the excitation system is limited upwardly by the material used for the permanent magnets, thereby establishing an upper limit for the magnetic flux density across the active area. When, after exhaustion of these parameters, the torque of a conventional electric machine is to be increased, it is necessary to enlarge the active area. In case of a rotating electric machine, this means a larger diameter or a greater axial length.

The invention provides a fundamentally different approach, by achieving an air gap field strength across the active area from the first functional part to the second functional part which is considerably higher than the residual flux density of the permanent magnets used. The "conversion factor" of the B-field, i.e., the magnetic field having a magnetic flux density B is determined in essence by the ratio of the size of the magnetic flux cross-sectional area of a permanent magnet to half of the magnetic flux outlet area into the active area of the magnetically conductive material portion adjacent the permanent magnet on one side. The conversion factor may easily be greater than 1.2 or greater than 1.3 or greater than 1.5, or even greater than 2.0.

When the B-field in the air gap is larger, the number of windings at the poles of the conductor system is decreased when the size of the machine remains the same. The lesser number of windings results in a quadratically lower inductance in the second functional part. This means that, while the rotational speed remains unchanged, the machine is adapted to commutate a higher current, or that the same current can be commutated at a higher rotational speed, whereby the performance of the machine increases in corresponding manner.

Otherwise, the possibility arises of building the machine —in case of the rotating machine—for instance with—an axially shorter length or—in case of the linear machine with narrower dimensions transversely to the direction of relative movement, without decreasing the electromotive force induced in the second functional part and without changing the inductance, such that the electric motor still outputs the same power. The circumstances described are coacting to the effect that it is possible on the basis of the invention to build, with the volume or weight remaining the same, an electric machine having a higher torque or higher power or having—in case of an electric generator—a higher electrical power. Or expressed in other terms: with a specific power demanded, the machine can be smaller and of lighter weight.

Due to the fact that the width of the permanent magnets, as measured in the direction of relative movement, increases as their distance from the active area increases and since this width of the magnetically conductive portions decreases as their distance from the active area increases, the effects resulting therefrom are a constructionally favorable configuration, low reluctance effects and high material utilization.

The electric machine according to the invention may be an electric motor or a current generator. A machine initially provided as an electric motor may also be operated in the generator mode. It may be an electric machine operating in a linear manner or an electric machine operating in a rotational manner, and in the first-mentioned case the active area is a plane of finite width and more or less great length, whereas in the second case the active area is either cylindrical when the first and second functional parts are located radially opposite each other, or annular when the first and second functional parts are located axially opposite each other. The direction of relative movement thus is either rectilinear or circular.

The magnetic flux outlet areas of the magnetically conductive material portions facing towards the active area are as a rule, plane in the case of the linear machine and in the case of the rotating machine with axially spaced first and second functional parts, and cylindrical in the case of the rotating machine with radially spaced first and second functional parts, but this is not necessarily so. When the magnetic flux outlet areas deviate from these simple geometries, one expediently considers in each particular case the projection of the respective area on the corresponding comparative area of the simple geometry outlined in order to determine the area ratio according to the invention. As a rule the permanent magnets of the excitation system—as seen progressively in the direction of relative movement—are connected to alternating poles such that the south pole of a first permanent magnet is followed by the south pole of a second permanent magnet, the north pole of the second permanent magnet is followed by the north pole of a third permanent magnet, and the south pole of the third permanent magnet is followed by the south pole of a fourth permanent magnet, etc. However, configurations are conceivable in which there is no such strict alternating sequence of the direction of magnetization of the permanent magnets. Furthermore, it is pointed out that electric machines according to the invention are conceivable as well having no magnetically conductive material but air provided between the permanent magnets.

According to a preferred development of the invention the surface of the first functional part facing the second functional part—as seen progressively in the direction of relative movement—alternatingly extends more or less close to the second functional part. The effect achievable with this measure is that at specific relative positions of the first and second functional parts, the magnetic flux in each individual magnetic circuit of the machine is maximum and is less than maximum at other relative positions. In the case of a smaller electrically induced magnetic flux the inductance of the machine is lower at the corresponding moment of time, which is advantageous at those times at which the current direction in the conductor system of the second functional part is reversed. When the electrically induced magnetic flux is at its maximum, the inductance of the machine at the corresponding moment of time or during the corresponding period of time is at its maximum, which is advantageous during that period of time during which the conductor system is fed with current of the same direction. This holds in particular for embodiments of the machine in which the conductor system, in the time periods between current reversal in the conductor system, is not fed with current in constant manner in terms of time, but in pulsed manner. The afore-discussed effects can be achieved in particularly favorable manner when the magnetically conductive portions on the side facing the active area each extend in their central portion closer to the second functional part, i.e. when the width of the air gap is reduced there. Or expressed in other words: the magnetically conductive portions, on the side facing the active area, are recessed at their edges facing the two adjacent permanent magnets such that the width of the air gap is larger there.

Similar effects can be produced by composing the magnetically conductive portions—as seen progressively in the direction of relative movement—of materials of different magnetic conductivity. In concrete terms, it would be possible to provide the central portion of each conductive material portion with a material of high magnetic conductivity and in the two edge portions of the magnetically conductive material portion with a material of lower magnetic conductivity.

The permanent magnets expediently may each consist throughout of the same material and, thus, are preferably neither in the direction of relative movement nor transversely thereto composed of layers of different materials.

The permanent magnets preferably consist of a material having a permeability which is close to the permeability of air, so that the relative permeability $\mu_r$ is close to one. Particularly preferred materials are materials on the basis of Se-Co (Se=rare earths, in particular samarium), Fe-Nd and certain ferrites. This reduces the inductance of the magnetic circuits of the machine.

The electric machine according to the invention preferably is electronically commutated. Such machines distinguish themselves in particular by an optimum capability of regulation and freedom of wear. Such an electric motor can be fed in the simplest case with direct current, and preferably in the time periods between current commutation or reversal of the current direction, a direct-current voltage is applied in the conductor system of the second functional part, which is turned on and off or pulsed by means of the electronic commutation means for keeping a desired medium current intensity that can be regulated. A favorable low pulse frequency results in case of the afore-described high inductance of the machine in the time periods between current commutation. When an alternating current source is available for feeding, the electric motor can be fed from a direct-current voltage intermediate circuit.

The electric machine according to the invention may comprise either a first functional part that is movable relative to the stationary second functional part, or a second functional part that is movable relative to the stationary first functional part, or two functional parts that are movable relative to each other, with none thereof being stationary. However, it is particularly preferred when the first functional part is the movable part of the electric machine, especially since no current has to be supplied to the first functional part.

When the electric machine according to the invention is constructed as a rotating machine having a cylindrical active area, the two possibilities of external rotor and internal rotor are feasible in principle. The construction with an external rotor is preferred in the interest of an as large as possible diameter of the active area and thus an as great as possible torque at a given volume, since the excitation part as a rule requires less space than the conductor system of the second functional part.

Due to the fact that the electric machine according to the invention can do without a magnetic return path on the back side of the excitation system facing away from the active area, it is preferred to connect the permanent magnets and the magnetically conductive portions to each other in positive manner and/or to provide a load receiving part of magnetically non-conductive material on the back side of the excitation system facing away from the active area. In the case of a rotating machine with a cylindrical active area the load receiving part is substantially cylindrical, in the case of a rotating machine with an annular active area the load rectangular part is substantially circular or annular, and in case of a linear machine load reclining part, is substantially rectangular. The load receiving part can be manufactured in a particularly expedient manner of plastics material, preferably a fiber-reinforced plastics material. In case of a rotating machine with an external rotor, it is especially expedient to provide a ring-shaped bandage in the load receiving part or to design the load receiving part as a whole as ring-shaped bandage which holds together the component parts of the excitation system against centrifugal force. Load receiving parts can be made using modern materials, in particular fiber materials or fiber-reinforced plastics materials, with an extremely high mechanical strength and with low volume and low weight.

BRIEF DESCRIPTION OF THE DRAWINGS

The invention and developments of the invention will be elucidated in more detail hereinafter on the basis of embodiments shown in the drawings in which:

FIG. 3a shows an electric machine which is modified in comparison with FIG. 2, in an identical sectional view, while

DETAILED DESCRIPTION OF THE PREFERRED EMBODIMENTS

Figure 1:
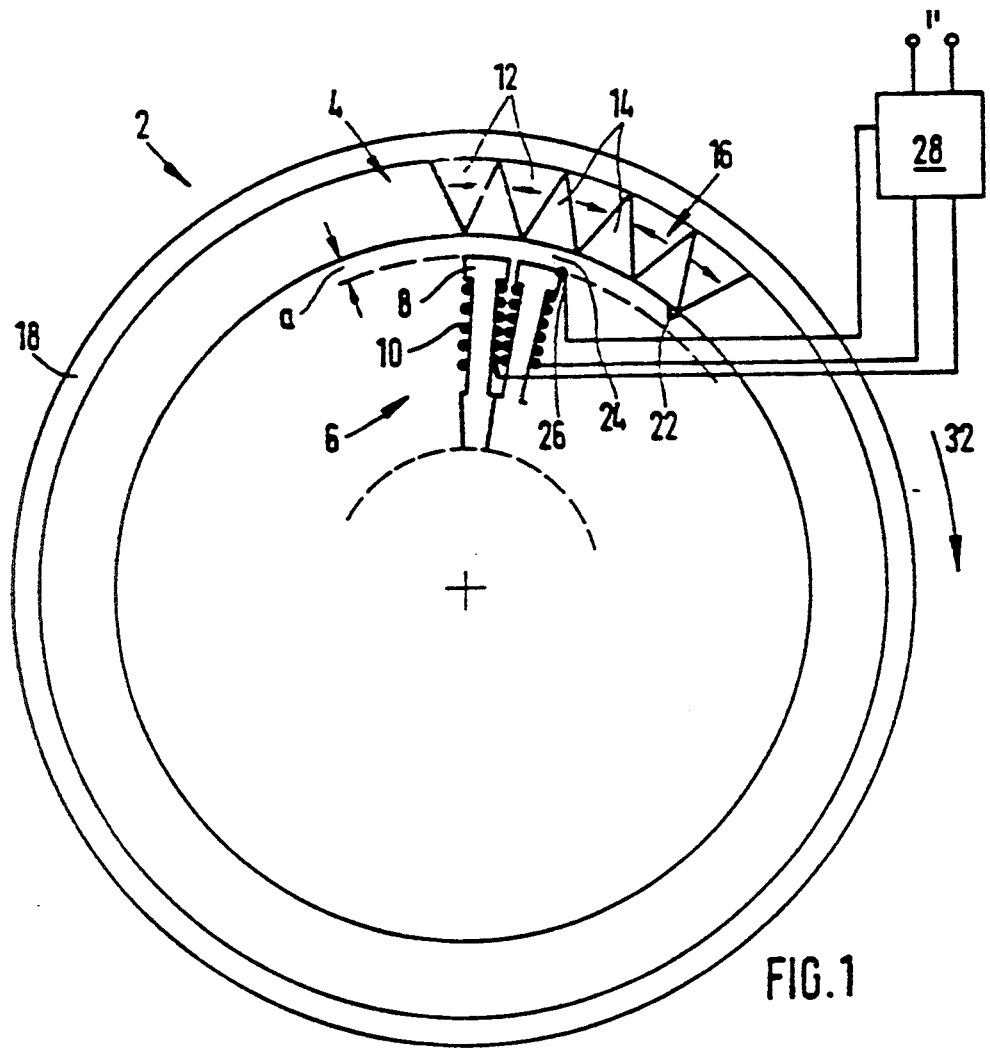
FIG. 1 shows schematically an electric machine with rotational movement, in a sectional view at right angles to the axis of rotation, with parts being omitted.
Figure 2:
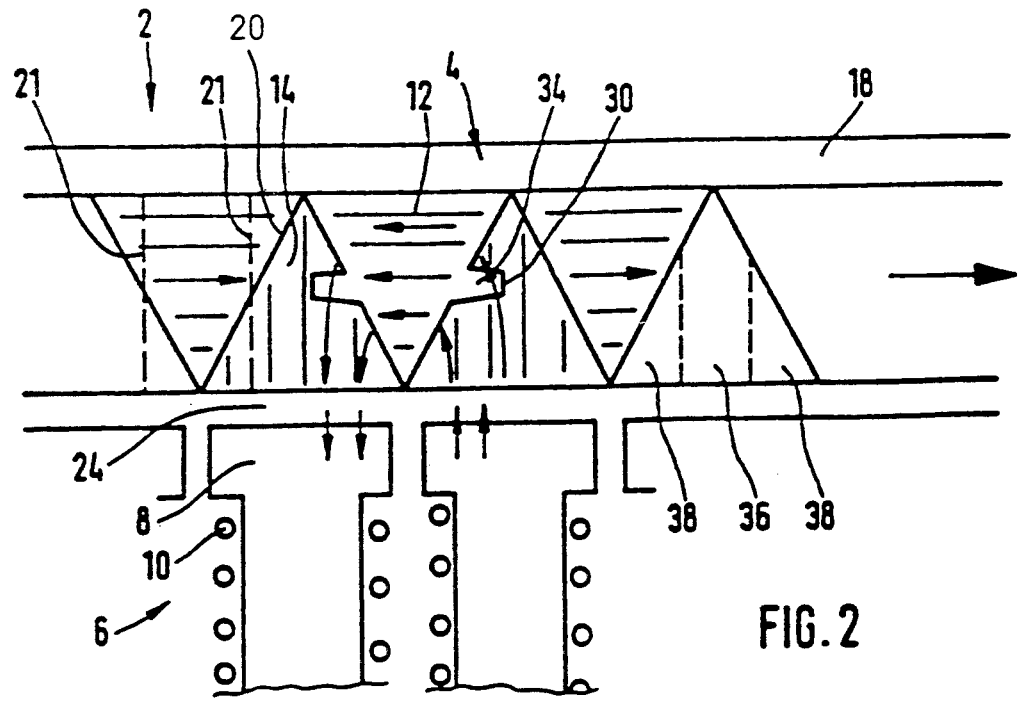
FIG. 2 shows a part of an electric machine with linear movement or rotational movement, in a sectional view at right angles to the active area of the machine and containing the direction of relative movement.

The machines schematically depicted in FIGS. 1 to 3 may be either a current generator or an electric motor. The following description is primarily oriented along the lines of an electric motor, however, due to this the understanding of a correspondingly constructed current generator will be obvious to an average expert.

The electric motor 2 shown in FIG. 1 is an external rotor motor in which a substantially tubular external rotor as a first functional part 4 is adapted to rotate around an inner, substantially cylindrical second functional part 6, namely the stator of the electric motor 2. The stator 6 has in annularly distributed manner stator poles 8 which—when considering a specific moment of time—are in circumferentially progressive manner an electromagnetic north pole or south pole in alternating manner. The poles 8 are each provided with a winding 10, and the windings 10 constitute the conductor system of the motor 2.

The rotor 4 is provided on its inside with permanent magnets 12 which, in the sectional view of FIG. 1, are of a triangular configuration with a radially inwardly directed tip, and with adjacent permanent magnets 12 abutting each other with their radially outer edges. Magnetically conductive material portions 14 are provided in circumferentially progressive manner between the permanent magnets 12, with each magnetically conductive material portion 14 being, in the sectional view of FIG. 1, of a triangular configuration with a radially outwardly directed tip. The permanent magnets 12 and the material portions 14, when seen jointly, are of annular configuration in the sectional view of FIG. 1 and constitute the excitation system 16 of the motor 2. The outsides or outer surfaces of the permanent magnets 12 and of the material portions 14 are radially surrounded by a substantially circular bandage 18, which is placed therearound either once or several times and consists for instance of substantially circumferentially extending glass fibers, carbon fibers, Kevlar fibers or plastics material or plastics material reinforced with such fibers.

Between the inner circumference of the rotor 4 and the outer circumference of the stator 6 there is located a substantially cylindrical active area having a radial width a which is usually designated as the air gap width. The active area, strictly speaking, is not a two-dimensional area, but an "active layer" which is not necessarily of equal thickness at all locations, as measured normal to the direction of relative movement.

As measured in circumferential direction, the individual poles 8 nearly have the same width as the material portions 14 on their radial inside.

The permanent magnets 12 each consist throughout or as a whole of the same material and are magnetized substantially in the circumferential direction of the rotor 4, as indicated by the arrows shown in the drawing, such that—in a circumferentially progressive manner—a permanent magnet 12 having its north pole directed in the clockwise direction is followed by a permanent magnet )2 having its north pole directed in the anticlockwise direction etc. Due to the fact that in each material portion 14 concerned, the sum of the magnetic flux cross-sectional areas of the two circumferentially adjacent permanent magnets 12 is larger than its magnetic flux outlet area 22 to the active area 24, the magnetic field strength present in the active area 24 is considerably above the remanence field strength of the permanent magnets 12.

26 designates a sensor which is secured to the outer circumference of the stator 6 and is responsive to the magnetic fields of the permanent magnets 12 moving past, thereby detecting the relative position of rotor 4 and stator 6. The signals of the sensor 26 are fed to a control unit 28 which commutates a direct-current feeding voltage for the conductor system at that moment when, as shown in FIG. 1, the stator poles 8 each are just located centrally opposite the material portions 14. As an alternative hereto, it is possible to provide a ring having control permanent magnets and rotating together with the rotor 4, with the sensor 26 being responsive to said control permanent magnets.

When the machine is constructed as a generator, an electronic control is not required for commutation, but may be provided for so to speak rectifying the current produced in the generator.

Figure 3A:
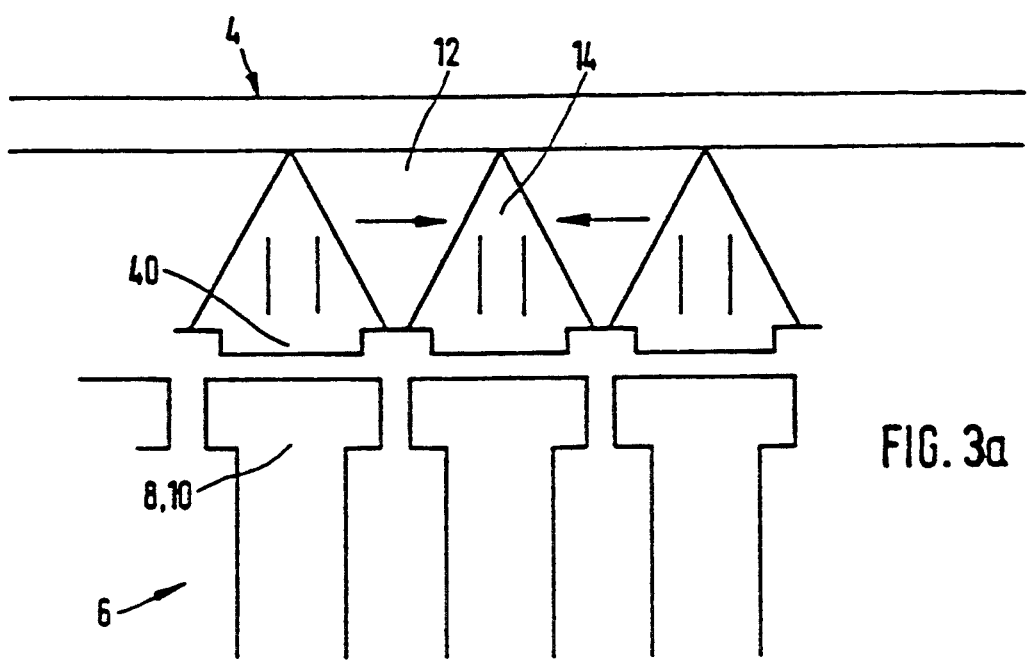

FIGS. 2 and 3a once more show the described fundamental conditions in an enlarged scale, with additional preferred details being shown as well. The shown representation of the first functional part 4 in a plane can be understood either as a developed view of a rotational motor according to FIG. 1 or as a representation of a linear motor 2.

Shown therein are the magnetic flux lines 30 belonging to a magnetic circuit of the motor 2, consisting of a permanent magnet 12, one half of a material portion 14 to the left thereof, one half of a material portion 14 to the right thereof and of two halves of solenoids 8, 10. Furthermore, magnetic flux cross-sectional areas 21 are shown in one of the permanent magnets 12 at two locations thereof, which extend at right angles to the active area 24. The respective cross-sectional area 21 can be imagined as a projection of the associated connecting or contact area 20 of the magnet 12 to the adjacent material portion 14 in the direction of relative movement. It is possible to see the magnetic flux concentration of the magnetic flux cross-sectional areas 21 of the permanent magnets 12 in the corresponding part of the active area 24.

Moreover, it is possible to see that the permanent magnets on both sides each have a nose 34 extending in the direction of relative movement 32 and engaging in corresponding grooves 30 of the material portions 14. For assembly, the permanent magnets 12 and the material portions 14 are slid together at right angles to the drawing plane of FIG. 2. The effect achieved in this manner is a mutual positive anchoring of the permanent magnets 12 and the material portions 14. Especially in case of motors subjected to less high loads, the load receiving part corresponding to the bandage 18 of FIG. 1 may be less strong or may be dispensed with.

Furthermore, the drawing shows the possibility that the material portions 14 consist in their middle portion of a material 36 of very high magnetic conductivity and consist in their left-hand and right-hand marginal portions shown in FIG. 2 of a material 38 of lower magnetic conductivity each.

FIG. 3a shows an embodiment in which, differently from the embodiments described so far, the area of the first functional part 4 facing the second functional part 6 is designed such that the width a of the air gap is smaller in each central portion of the material portions 14 than in the marginal portions of the material portions 14. Thus, projection portions 40 result which extend nearer to the second functional part 6 than the portions therebetween. The effect achieved thereby is that, in the position shown in FIG. 3a, the inductance of the motor is particularly low, which is of assistance for a rapid current built-up in the windings )0 after voltage reversal by means of the control unit 28.

Figure 3B:
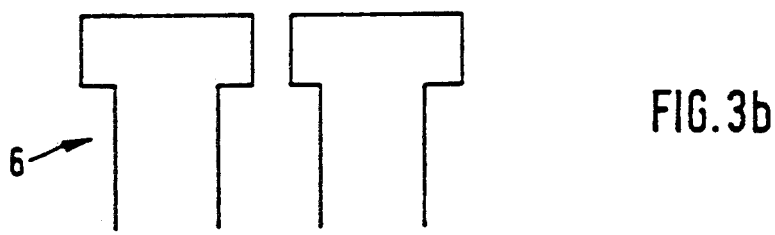
FIG. 3b shows the stator of the machine of FIG. 3a displaced relative to the rotor.
Figure 4:
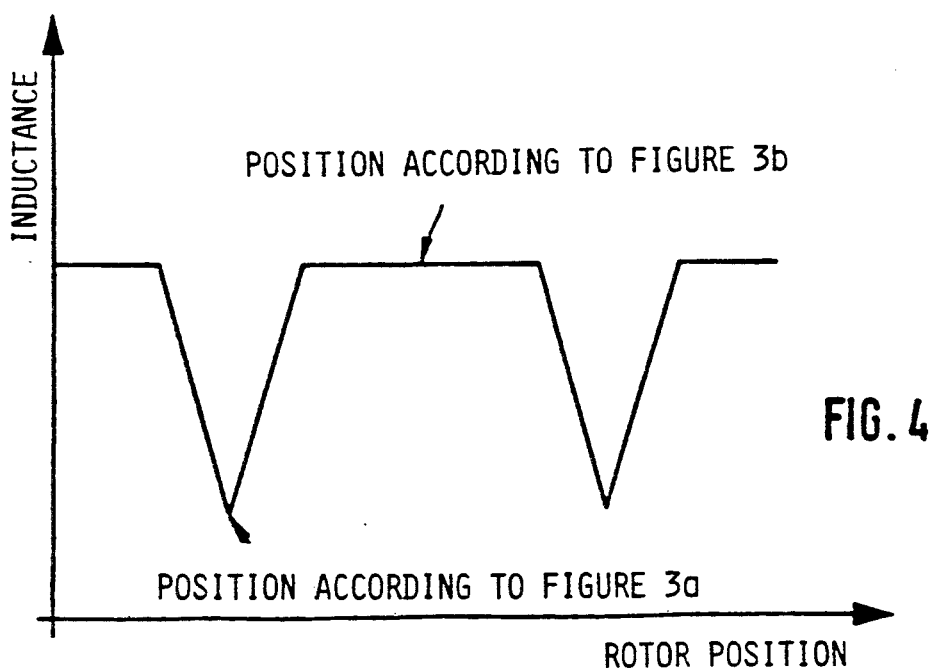
FIG. 4 shows a graphic representation of the change of inductance of the machine according to FIGS. 3a and 3b with changing relative position of the first and second functional parts.

When, in contrast thereto, as shown in FIG. 3b, the poles 8 each have their center located opposite the possibly flattened tip of a permanent magnet 12 facing the active area 24, the inductance of the motor is higher, which is more favorable in particular for supplying the motor with pulsed direct current. The variation of the inductance of the motor for the conditions shown in FIGS. 3a and 3b is graphically illustrated in FIG. 4.

We claim:

1. An electric machine comprising a stator having a conductor system, and a rotor having a permanently magnetic excitation system, with an active area of an air gap being present between the stator and the rotor, and with
   (a) said rotor being an external rotor having the active area on an inside;
   (b) said rotor having, as seen progressively in a direction of rotation, an alternating sequence of permanent magnets, which are magnetized in the direction of rotation, and of magnetically conductive material portions;
   (c) said permanent magnets, in cross-section at right angles to an axis of rotation of the rotor, being substantially triangular, with their width increasing from the inside to an outside, and said magnetically conductive material portions having their width decreasing from the inside to the outside;
   (d) said magnetically conductive material portions each having a magnetic flux outlet area facing the active area and being smaller than a sum of respective magnetic flux cross-sectional areas of two adjacent of said permanent magnets so that magnetic flux of the permanent magnets is concentrated for the active area;
   (e) said permanent magnets consisting of a material having a permeability close to the permeability of air.

2. An electric machine according to claim 1, wherein the permanent magnets each consist throughout of the same material.

3. An electric machine according to claim 1, wherein the magnetically conductive material portions, as seen progressively in the direction of rotation, are composed of materials of different magnetic conductivity.

4. An electric machine according to claim 1, and means for electronically commutating the machine.

5. An electric machine according to claim 1, wherein a surface of the rotor facing the stator, as seen progressively in the direction of rotation, alternatingly extends close to and further away from the stator.

6. An electric machine according to claim 5, wherein the magnetically conductive material portions each have in their center a projection extending closer to the stator.

7. An electric machine according to claim 1, wherein the permanent magnets and the magnetically conductive material portions are positively connected to each other.

8. An electric machine according to claim 1, wherein a load receiving part of magnetically non-conductive material is provided on the back side of the permanent magnets and of the magnetically conductive material portions facing away from the active area.

9. An electric machine according to claim 8, wherein the load receiving part is made of plastics material.

10. An electric machine according to claim 9, wherein the plastic material is fiber-reinforced.

11. An electric machine according to claim 8, wherein the load receiving part comprises a bandage placed around the outside of the rotor.

* * * * *